United States Patent
Sasaoka (10) Patent No.: US 8,447,156 B2
(45) Date of Patent: May 21, 2013

(54) MULTI-CORE OPTICAL FIBER (75) Inventor: Eisuke Sasaoka, Yokohama (JP)

(73) Assignee: Sumitomo Electric Industries, Ltd., Osaka-shi, Osaka (JP)

(*) Notice: Subject to any disclaimer, the term of this patent is extended or adjusted under 35 U.S.C. 154(b) by 120 days.

(21) Appl. No.: 12/743,175

(22) PCT Filed: Jan. 19, 2010

(86) PCT No.: PCT/JP2010/050523
§ 371 (c)(1),
(2), (4) Date: Aug. 13, 2010

(87) PCT Pub. No.: WO2010/082656
PCT Pub. Date: Jul. 22, 2010

(65) Prior Publication Data
US 2011/0052129 A1    Mar. 3, 2011

(30) Foreign Application Priority Data

Jan. 19, 2009   (JP) ................ P2009-009095
Jan. 20, 2009   (JP) ................ P2009-010217
Aug. 4, 2009    (JP) ................ P2009-181702

(51) Int. Cl.
G02B 6/036    (2006.01)
G02B 6/02     (2006.01)
G02B 6/028    (2006.01)

(52) U.S. Cl.
USPC ............ 385/126; 385/123; 385/127; 385/128

(58) Field of Classification Search
USPC ........................................... 385/126
See application file for complete search history.

(56) References Cited

U.S. PATENT DOCUMENTS

| 4,000,416 A | 12/1976 | Goell |
| 4,026,693 A | 5/1977 | Sato |
| 4,304,584 A | 12/1981 | Borrelli et al. |
| 4,409,477 A | 10/1983 | Carl |
| 4,820,010 A | 4/1989 | Scifres et al. |
| 5,155,790 A | 10/1992 | Hwang |
| 5,216,738 A | 6/1993 | Feder |

(Continued)

FOREIGN PATENT DOCUMENTS

| CN | 101281275 A | 10/2008 |
| GB | 2 138 165 A | 10/1984 |

(Continued)

OTHER PUBLICATIONS

European Search Report issued in European Patent Application No. 10000304.5-2216, mailed 7, 2010.

(Continued)

*Primary Examiner* — Rhonda Peace
(74) *Attorney, Agent, or Firm* — McDermott Will & Emery LLP (57) ABSTRACT

The present invention relates to a multi-core optical fiber having a structure to effectively reduce crosstalk between adjacent core regions among a plurality of core regions. The multi-core optical fiber (1) has a leakage reduction portion (50), at least a portion of which is arranged at a position on a straight line connecting adjacent core regions together among a plurality of core regions (10). The leakage reduction portion (50) reduces leakage light in the multi-core optical fiber (1) from each of the core regions (10), thereby effectively reducing crosstalk between adjacent core regions.

3 Claims, 9 Drawing Sheets

U.S. PATENT DOCUMENTS

| | | | |
|---|---|---|---|
| 5,381,505 A | | 1/1995 | Fischietto et al. |
| 5,655,043 A | | 8/1997 | Davies et al. |
| 5,712,941 A | * | 1/1998 | Imoto et al. ............... 385/126 |
| 6,188,824 B1 | * | 2/2001 | Teshima ..................... 385/126 |
| 6,611,648 B2 | * | 8/2003 | Kumar et al. ............... 385/126 |
| 6,925,239 B2 | * | 8/2005 | Wang et al. ................. 385/127 |
| 7,072,532 B2 | | 7/2006 | Watts |
| 7,164,835 B2 | * | 1/2007 | Matsuo et al. .............. 385/127 |
| 7,283,714 B1 | | 10/2007 | Gapontsev et al. |
| 7,289,707 B1 | | 10/2007 | Chavez-Pirson et al. |
| 7,526,166 B2 | | 4/2009 | Bookbinder et al. |
| 7,755,838 B2 | | 7/2010 | Chaves et al. |
| 7,899,294 B2 | * | 3/2011 | Chen et al. ................. 385/128 |
| 7,903,918 B1 | * | 3/2011 | Bickham et al. ........... 385/124 |
| 8,189,978 B1 | * | 5/2012 | Bennett et al. ............. 385/127 |
| 2002/0021501 A1 | | 2/2002 | Kawashima et al. |
| 2002/0126971 A1 | | 9/2002 | Soufiane |
| 2002/0176677 A1 | * | 11/2002 | Kumar et al. ............... 385/126 |
| 2003/0031436 A1 | | 2/2003 | Simmons et al. |
| 2004/0105642 A1 | | 6/2004 | Bickham |
| 2004/0252961 A1 | | 12/2004 | Peuchert et al. |
| 2005/0111801 A1 | | 5/2005 | Garman et al. |
| 2008/0013905 A1 | | 1/2008 | Bookbinder et al. |
| 2008/0056658 A1 | | 3/2008 | Bickham et al. |
| 2008/0205840 A1 | | 8/2008 | Wakabayashi et al. |
| 2008/0279517 A1 | | 11/2008 | Bickham et al. |
| 2011/0052129 A1 | * | 3/2011 | Sasaoka ..................... 385/126 |
| 2011/0206330 A1 | * | 8/2011 | Sasaoka ..................... 385/126 |
| 2011/0222828 A1 | * | 9/2011 | Sasaoka et al. ............. 385/127 |
| 2012/0134637 A1 | * | 5/2012 | Imamura ..................... 385/127 |

FOREIGN PATENT DOCUMENTS

| | | |
|---|---|---|
| JP | 56-169140 | 12/1981 |
| JP | 58-013504 | 1/1983 |
| JP | 05-341147 | 12/1993 |
| JP | 10-104443 | 4/1998 |
| JP | 2008-534995 | 8/2008 |
| WO | WO 91/15786 | 10/1991 |
| WO | WO 2006-100488 | 9/2006 |
| WO | WO 2008/157341 A2 | 12/2008 |

OTHER PUBLICATIONS

European Search Report issued in European Patent Application No. 10000304.5-2216, mailed Jul. 1, 2010.
European Search Report issued in European Patent Application No. 10151183.0-1524, mailed 6, 2010.
Romaniuk, R., et al., "Multicore optical fiber components", Sep. 1986, pp. 117-124, SPIE Components for Fiber Optic Applicatons vol. 722.
English translation of International Preliminary Report on Patentability (Chapter I) issued in International Patent Application No. PCT/JP2010/050523 dated Aug. 25, 2011.
United States Office Action, issued in U.S. Appl. No. 12/690,496, dated Mar. 12, 2012.
European Search Report issued in European Patent Application No. EP 10151183.0 dated Sep. 24, 2010.
U.S. Office Action issued in U.S. Appl. No. 12/689,596, dated Feb. 23, 2012.
Koshiba, M., et al., "Heterogeneous multi-core fibers: proposal and design principle", IEICE Electronics Express, Jan. 2009, pp. 98-103, vol. 6, No. 2, IEICE.
Osono, K., et al., "Development of High Efficiency Holey Fibers", 2007, pp. 71-76, No. 26, Partial English translation.
Matsuo, S., et al., "Design Optimization of Trench Index Profile for the same dispersion characteristics with SMF", JWA2.
Takenaga, K., et al., "Evaluation of High-Power Endurance of Bend-Insensitive Fibers", Proceedings of 2008 IEICE General Conference B-10-23, Mar. 18-21, 2008, p. 306.
International Search Report issued in International Patent Application No. PCT/JP2010/050523, mailed Feb. 16, 2010.
US Office Action issued in U.S. Appl. No. 12/689,596 dated Jul. 25, 2012.
United States Notice of Allowance issued in U.S. Appl. No. 12/690,496 dated Jul. 27, 2012.
Office Action dated Oct. 31, 2012 in CN Patent Application No. 201010012710.0.
United States Notice of Allowance issued in U.S. Appl. No. 12/690,496, dated Jul. 27, 2012.
United States Office Action issued in U.S. Appl. No. 13/745,248, dated Mar. 29, 2013.

* cited by examiner

MULTI-CORE OPTICAL FIBER

RELATED APPLICATIONS

This application is the U.S. National Phase under 35 U.S.C. §371 of International Application No. PCT/JP2010/050523, filed on Jan. 19, 2010, which in turn claims the benefit of Japanese Application Nos. 2009-009095, filed on Jan. 19, 2009, 2009-010217, filed on Jan. 20, 2009 and 2009-181702, filed on Aug. 4, 2009, the disclosures of which Applications are incorporated by reference herein.

TECHNICAL FIELD

The present invention relates to a multi-core optical fiber, in which a plurality of core regions are arranged in the same cross-section, as a transmission medium for optical communication.

BACKGROUND ART

At present, optical fiber communication networks are expanding from trunk systems to ordinary homes, and are gaining wide recognition as FTTH (Fiber To The Home) services. Nearly all the optical fibers employed in such communication networks are silica-based fibers, and has a total reflection-type optical waveguide structure provided with a greater refractive index difference with respect to the cladding region by doping, for example, $GeO_2$ or another refractive index increaser to the core region. In particular, the above FTTH services are realized through so-called PON (Passive Optical Network) systems, in which subscribers share a single optical fiber by interposing a multistage optical splitter between the interior of a terminal station which is a final relay station of an existing communication system such as the Internet and the like, and the interval from the terminal station to subscriber homes.

However, in a PON system in which a plurality of subscribers share a single optical fiber by interposing a multistage optical splitter as described above, it is a fact that there are technical problems with respect to future increases in transmission capacity, such as congestion control and securing reception dynamic range. As one means of resolving these technical problems (congestion control, securing of dynamic range, and the like), movement to a SS (Single Star) system is conceivable. When moving to a SS system, the number of fiber cores on the station side is increased compared with a PON system, and so station-side optical cables with extremely small diameters and ultra-high densities are essential. Multi-core optical fibers are suitable as extremely small-diameter, ultra-high density optical fibers which answer such demands.

A multi-core optical fiber is an optical fiber having a plurality of cores, each of which functions as an optically independent optical waveguide. However, because the core regions are in proximity with each other, in a state in which high-power light propagates in each core, crosstalk occurs, arising from the propagation of light which has leaked from each of the cores when small-diameter bending is applied, and, when the fiber length is long, arising from a portion of light propagating outside the core regions even in a state in which no bending is applied. Hence, in for example Non-patent Reference 1 below, a design example of a multi-core optical fiber with a target value for crosstalk between core regions of −30 dB or lower is disclosed in FIG. 3, and in a design example with a relative refractive index difference $\Delta$ of 1.2% (FIG. 3(c)), a multi-core optical fiber with 19 core regions is proposed. In this specification, light contributing to crosstalk between core regions, regardless of the origin of the occurrence thereof, is hereafter called leakage light.

PRIOR ART REFERENCES

Non-Patent References

Non-patent Reference 1: IEICE Electronics Express, Vol. 6, No. 2, pp. 98-103, Jan. 26, 2009

DISCLOSURE OF THE INVENTION

Problems that the Invention is to Solve

The present inventors have examined in detail conventional techniques to reduce crosstalk in multi-core optical fibers such as described above, and as a result, have discovered the following problems.

First, there is the possibility that the crosstalk target value between core regions, disclosed in the above Non-patent Reference 1, may be inadequate as considering long-haul optical transmission. That is, in the above Non-patent Reference 1, −30 dB or lower is taken as a target for crosstalk after light propagation over 100 km, but in overland trunk lines, the system length (total fiber length) may be 1000 km or more. Further, in transoceanic systems, system lengths may reach 10000 km. For fiber sections in which crosstalk is comparatively small, it is thought that when the propagation length is ten times greater the crosstalk between core regions degrades by approximately 20 dB, and so when crosstalk after light propagation over 100 km is −30 dB, the crosstalk after light propagation over 1000 km is expected to be degraded to approximately −10 dB, and so there is a high probability that this target value is inadequate in order to realize high-quality optical transmission.

Further, there is a possibility that increasing the $\Delta$ value (increasing the relative refractive index difference between core region and cladding region) introduced in the above Non-patent Reference 1 as a technique for crosstalk reduction is inappropriate. That is, an increased $\Delta$ value reinforces light confinement in the core region, and so is effective for reducing crosstalk between core regions, but there is a high possibility that transmission losses and nonlinearity of the optical fiber may be increased. Hence, there is increased danger that the propagation performance per core region in a multi-core optical fiber may be degraded.

On the other hand, when application of a multi-core optical fiber to a transmission medium for long-haul optical transmission is considered, clearly it is desirable that propagation losses be lower. When wavelength multiplexed transmission is performed as means of realizing large-capacity transmission, in order to realize greater transmission capacity, signal light with a larger number of wavelengths must be inputted into the optical fiber. Further, when the modulation rate is raised, or the number of modulation levels is increased, as means of realizing large-capacity transmission, in order to maintain an error rate comparable to that of conventional optical transmission, the optical SN ratio must be improved. In concrete terms, the optical power inputted into the optical fiber must be increased. In any case, the total optical power propagating in the optical fiber must be increased, and in order to secure higher transmission quality, it can easily be predicted that a crosstalk reduction technique will be necessary in place of the increasing of the $\Delta$ value (reinforcement of light confinement to core regions) described above.

The present invention has been developed to eliminate the problems described above. It is an object of the present invention to provide a multi-core optical fiber, comprising a structure to effectively suppress degradation of transmission quality arising from the occurrence of crosstalk between plural core regions.

Means for Solving the Problems

A multi-core optical fiber according to the present invention is an optical fiber having a plurality of core regions, each of which functions as an optically independent optical waveguide, and more specifically, has, within the same cross-section, the plurality of core fiber regions each comprising a core region extending along the optical axis and a cladding region provided on the outer periphery of the core region. In particular, the multi-core optical fiber according to the present invention comprises a leakage reduction portion to reduce leakage light in the multi-core optical fiber from each of the core regions, and at least a portion of the leakage reduction portion exists on a straight line connecting core regions together in adjacent core fiber regions, among the plurality of core fiber regions.

As described above, in the multi-core optical fiber according to the present invention, by the leakage reduction portion arranged so as to be positioned between adjacent core regions, crosstalk arising from leakage light from each of the core regions can effectively be reduced, without increasing transmission loss of the multi-core optical fiber. Further, it is preferable that the leakage reduction portion of the multi-core optical fiber according to the present invention be formed within a cladding region so as to have a ring shape surrounding a core region in the same cross-section. At least a portion of the leakage reduction portion may be positioned between core regions, or may be configured such that the plural core fiber regions share a single cladding region. In this case, adjacent core fiber regions among the plurality of core fiber regions are in contact with each other, through the leakage reduction portion.

Further, in the multi-core optical fiber according to the present invention, it is preferable that the leakage reduction portion be a region forming a refractive index profile, such that a confinement factor of propagating light in a region surrounded by the leakage reduction portion is raised. In concrete terms, the leakage reduction portion is formed so as to effectively reduce the refractive index. For example, as a configuration for reducing the refractive index, in the cladding regions of a plurality of core fiber regions in the leakage reduction portion, either a refractive index reducer is doped, or a hollow hole is formed in order to constitute the leakage reduction portion. Or, a configuration is conceivable in which the refractive index of the leakage reduction portion is increased, such that leakage light is confined within the leakage reduction portion. As a configuration in which the refractive index is increased, a refractive index increaser may be doped in each of the cladding regions of a plurality of core fiber regions, to constitute the leakage reduction portion.

Further, in the multi-core optical fiber according to the present invention, the leakage reduction portion may be comprised of a material which reduces the power of leakage light. In this case, at least one of an absorption coefficient and a scattering coefficient of the constituent material is greater than that of the cladding region.

Effects of the Invention

In a multi-core optical fiber according to the present invention, by the leakage reduction portion positioned such that at least a portion is between adjacent cores, the advantageous result of reduction of crosstalk between adjacent cores is obtained, without increasing transmission loss in the multi-core optical fiber.

BEST MODES FOR CARRYING OUT THE INVENTION

In the following, embodiments of an optical fiber according to the present invention will be explained in detail with reference to FIGS. 1 to 9. In the description of the drawings, identical or corresponding components are designated by the same reference numerals, and overlapping description is omitted.

Figure 1:
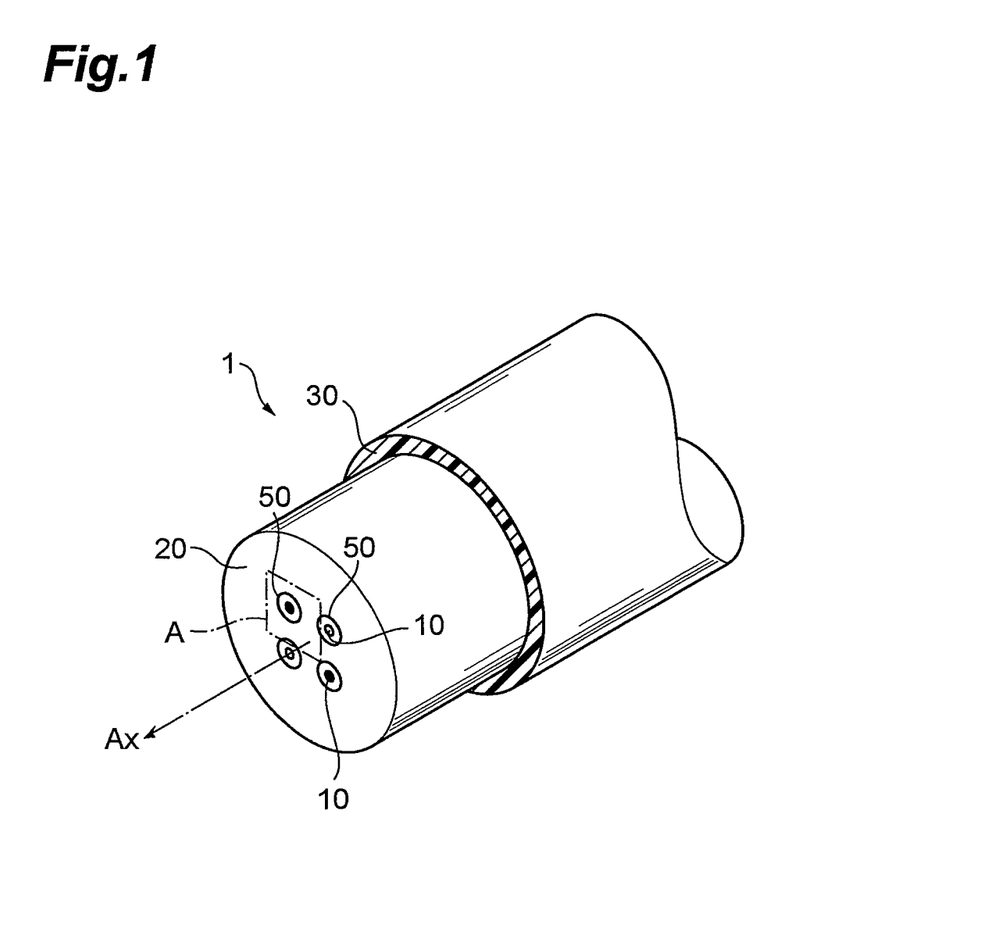
FIG. 1 is a perspective view showing the representative cross-sectional structure of a multi-core optical fiber according to the present invention.

FIG. 1 shows the representative cross-sectional structure of a multi-core optical fiber according to the present invention. As shown in FIG. 1, the multi-core optical fiber 1 comprises a bare optical fiber including a plurality of core regions 10 each extending along the optical axis AX, and a resin covering 30 provided on the outer periphery of the bare optical fiber. The bare optical fiber is constituted by a plurality of core regions 10, and a cladding region 20 surrounding these core regions 10. The cladding region covering each of the core regions 10 may be a common cladding region which integrally covers each of the core regions 10, or may be cladding regions prepared for each of the core regions 10. In either configuration, in this specification, a region constituted by a core region and a cladding region positioned on the outer periphery thereof is called a core fiber region, as a region which has essentially a waveguide structure.

In the multi-core optical fiber having a structure as described above, by arranging the plurality of core regions in a state in which core regions with different optical characteristics are adjacent to each other, a crosstalk reduction effect is obtained. The crosstalk reduction effect is explained referring to FIG. 2. The multi-core optical fiber 11 shown in FIG. 2 has a structure in which core regions 10a belonging to a first group, having predetermined optical characteristics, and core regions 10b belonging to a second group, having optical characteristics different from those of the first group, are integrally covered by a common cladding region 20; a resin covering 30 is provided on the periphery of the cladding region 20. In concrete terms, by causing the refractive index profiles, core diameters, and similar of the core regions to be changed between the core regions 10a belonging to the first group and the core regions 10b belonging to the second group, the propagation constants are different between the core regions. Further, in the multi-core optical fiber 11, by arranging the core regions 10a, 10b with different optical characteristics so as to be adjacent, the advantageous result of suppressing crosstalk between adjacent core regions is obtained.

Figure 2:
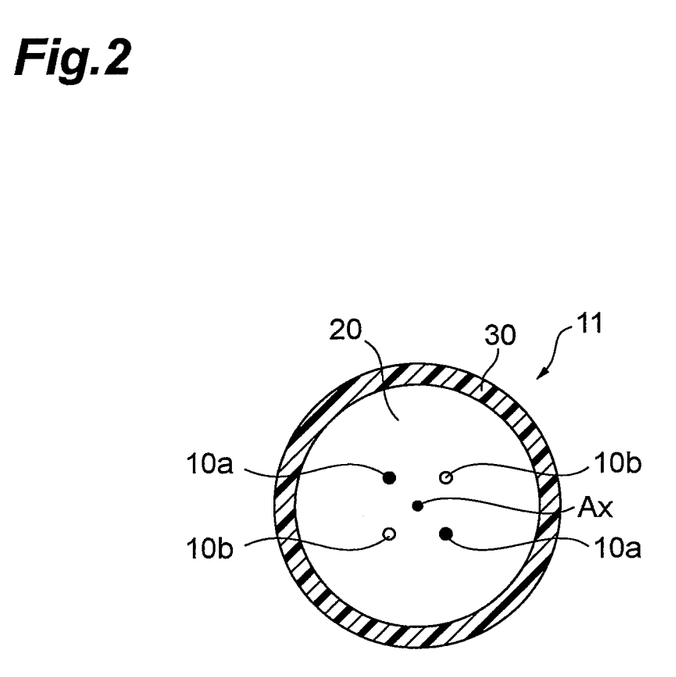
FIG. 2 is a view for explaining an example of a crosstalk reduction technique in a multi-core optical fiber.

In FIG. 2, an example of a uniform cladding region is shown; but by either adopting a hole-assisted structure in which holes are provided on the periphery of each core region, or by adopting a structure in which trenches are provided on the periphery of each core region, bending losses can be reduced, and crosstalk between cores can be further reduced also. In the present invention, by providing a leakage reduction portion 50 to reduce leakage light in the multi-core optical fiber 1 from each of the core regions 10 as shown in FIG. 1, a technique for effective reduction of crosstalk between core regions 10 is realized.

Figure 3:
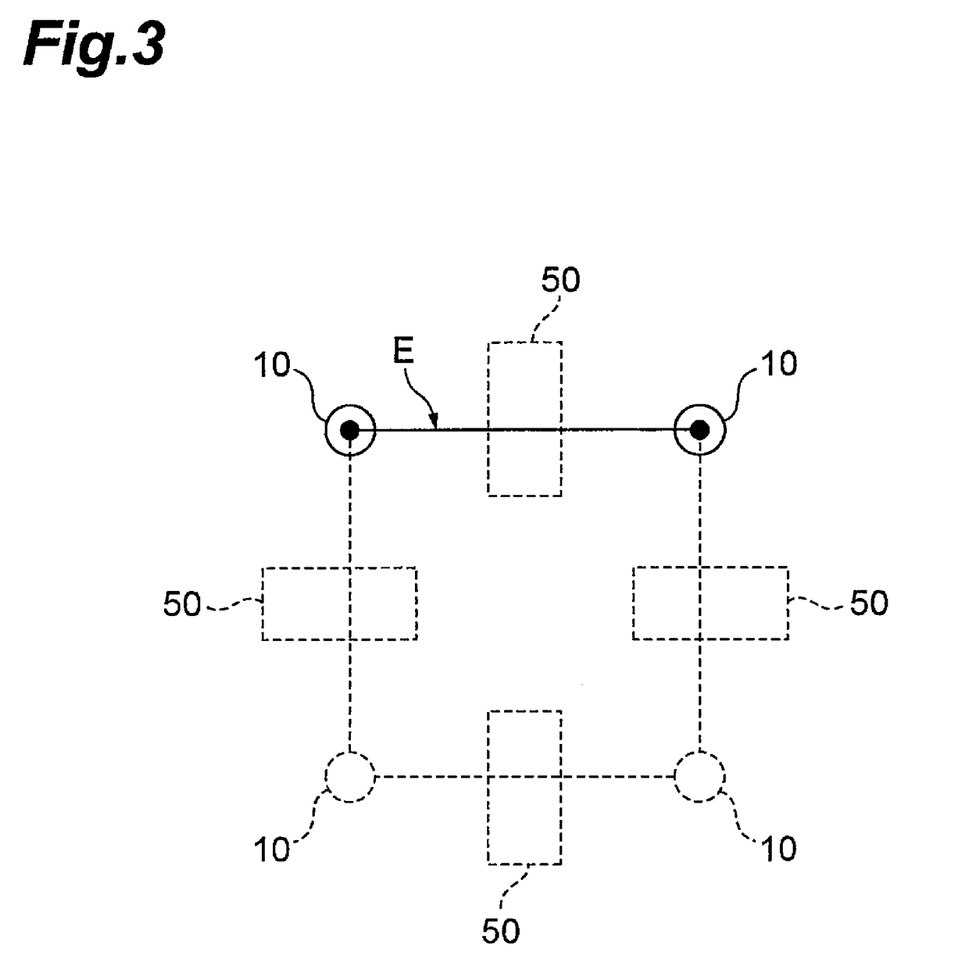
FIG. 3 is a view for explaining conditions for arrangement of a leakage reduction portion applied to a multi-core optical fiber according to the present invention.
Figure 4:
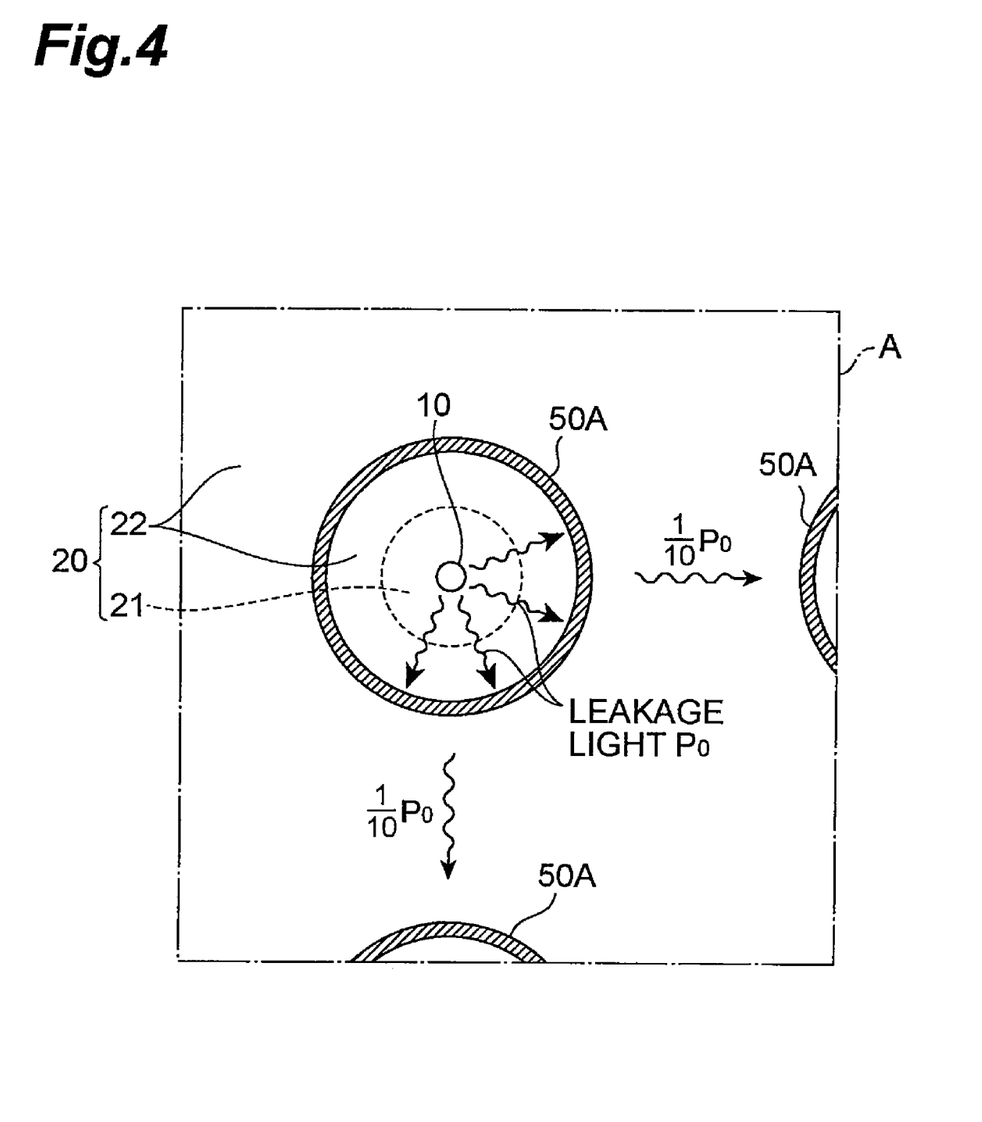
FIG. 4 is a view for explaining a leakage light reduction mechanism as well as the structure and function of a leakage reduction portion.

That is, as shown in FIG. 3, in the multi-core optical fiber 1 according to the present embodiment, the leakage reduction portions 50 are arranged on straight lines E connecting the centers of adjacent core regions 10. FIG. 4 shows a more specific configuration. FIG. 4 is a view for explaining the leakage light reduction mechanism as well as the structure and function of a leakage reduction portion, and is equivalent to the region A shown in FIG. 1 (the regions in the cross-section of the multi-core optical fiber 1 perpendicular to the optical axis AX).

In the example shown in FIG. 4, a ring-shaped leakage reduction portion 50A is prepared for each core region 10, surrounding the corresponding core region 10 within the cladding region 20 which together with the core region 10 forms one core fiber region. Particularly, in the example shown in FIG. 4, the cladding region 20 comprises an optical cladding 21, provided on the outer periphery of the core region 10 as a region which influences the transmission characteristics of light propagating in the core region 10, and a physical cladding 22, provided on the outer periphery of the optical cladding 21 as a region which does not influence the transmission characteristics of light propagating in the core region 10. It is preferable that the leakage reduction portion 50A be formed within the physical cladding 22, so as to avoid degradation of the transmission performance of each of the core regions 10. The optical cladding 21 and physical cladding 22 are regions which are differentiated from the functional standpoint of whether transmission characteristics are affected; structural differentiation, based on composition or the like, is not possible. Hence, in the attached drawings, in order to facilitate understanding of the present invention of this application, the boundary between the optical cladding 21 and the physical cladding 22 which form the cladding region 20 is shown for convenience by a dashed line.

Further, as shown in FIG. 4, the leakage reduction portion 50A is a region which reduces the power of leakage light from the core region 10, and functions to effectively reduce the light quantity of leakage light by deflection control through absorption, scattering, confinement, and similar. Further, in the cross-section of the multi-core optical fiber 1 perpendicular to the optical axis AX, the leakage reduction portion 50A is provided between the position at which the distance from the center of the core region 10 is $5/2$ times the MFD at wavelength 1.55 µm of the core fiber region containing the core region 10, and the outer peripheral face of the cladding region (the interface between the physical cladding 22 and the resin covering 30). Or, the leakage reduction portion 50A may be provided between the position at which the electric field amplitude in the core fiber region containing the core region 10 is $10^{-4}$ or lower of the peak value thereof, and the peripheral face of the cladding region 20.

In the configuration described above, when, due to small-diameter bending (bending at a small radius of curvature applied to the multi-core optical fiber 1 during high-power light propagation), leakage light with light quantity $P_0$ from the core region 10 reaches the leakage reduction portion 50A, the light quantity of the leakage light is reduced in the leakage reduction portion 50A by deflection control through absorption, scattering, confinement, and similar. Specifically, the light quantity of leakage light passing through the leakage reduction portion 50 is reduced to $1/10$ of the light quantity $P_0$ of leakage light arriving at the leakage reduction portion 50A (see FIG. 4). As a result, crosstalk arising from arrival of leakage light at an adjacent core region 10 is effectively reduced.

Figure 5:
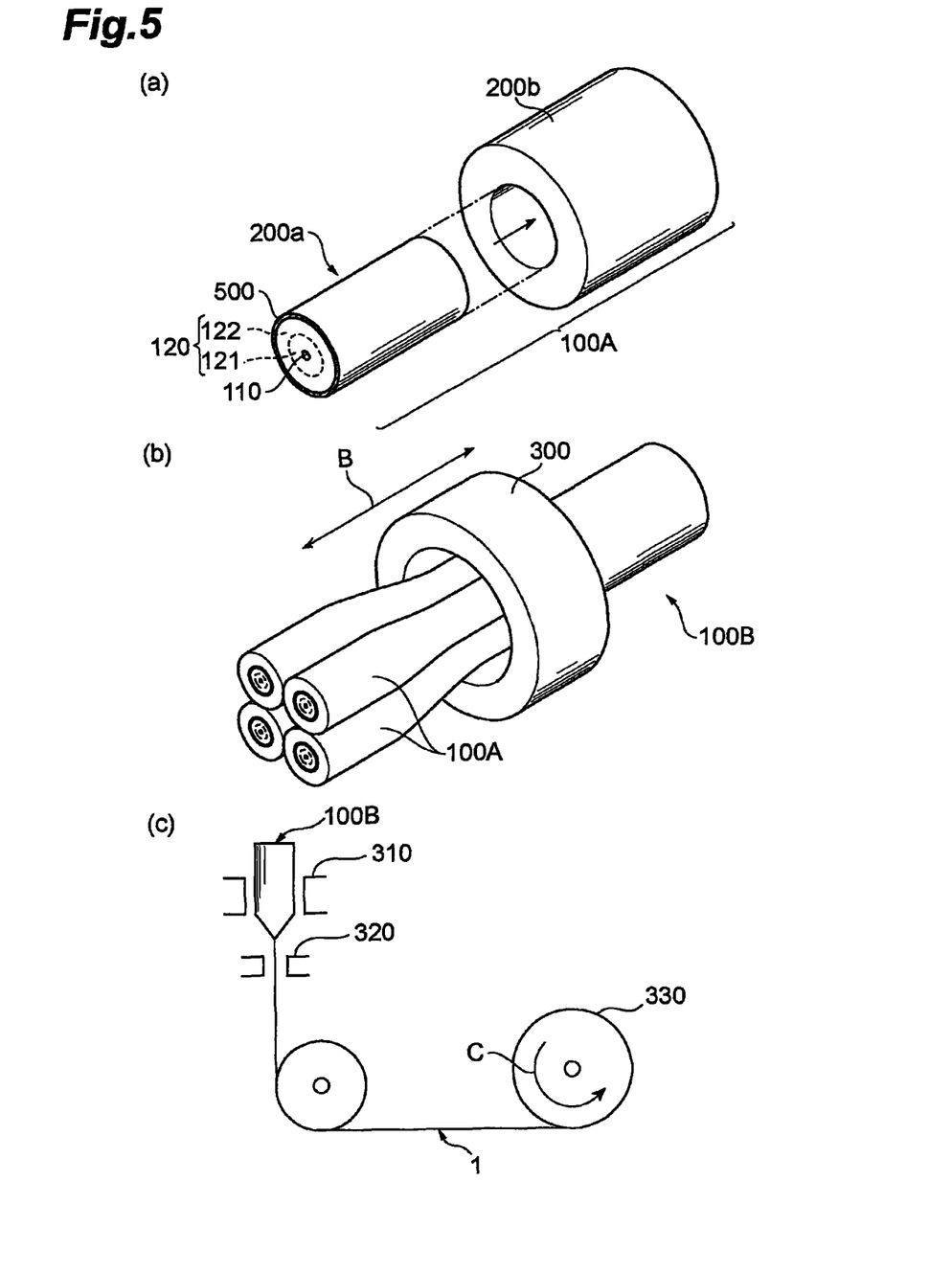
FIG. 5 is a view for explaining each of the manufacturing processes of the multi-core optical fiber according to the present embodiment.

Next, as the multi-core optical fiber 1 according to the present embodiment, manufacturing processes are explained, referring to FIG. 5, for the multi-core optical fiber (see FIG. 4) in which the ring-shaped leakage reduction portions 50A are formed on the outer periphery of each core region 10, and, in particular, in regions equivalent to physical cladding 22 of the core fiber region containing the core region 10. The multi-core optical fiber to be manufactured is a silica-based optical fiber, and in each of the core fiber regions (constituted by the core region 10 and the cladding region 20 positioned on the outer periphery thereof), $GeO_2$ is doped in each core region 10 as a refractive index increaser, and the cladding regions 20, provided on the outer periphery of each core region 10, is comprised of pure silica. Each of the plural core fiber regions arranged in the same cross-section in the manufactured multi-core optical fiber has a step-structure refractive index profile. Further, in the step-structure refractive index profile, the relative refractive index difference between core and cladding is 0.4% or lower. By means of a multi-core optical fiber formed in this way, crosstalk between core regions after propagation over 100 km can be kept to −50 dB.

First, a plurality of members which are to become core fiber regions are arranged in the same cross-section of the multi-core optical fiber which is to be manufactured. Particularly, as shown in FIG. 5(a), the members 100A which are to become core fiber regions comprise fiber members 200a, of which layer to be formed as the leakage reduction portion 50A reaches the outermost layer, and a hollow member 200b having a penetrating hole coinciding with the cross-sectional shape of the fiber member 200a. The fiber member 200a comprises a silica-based glass, and comprises, in order from the center-side to peripheral face, a center region 110 which is to become the core region 10, an intermediate region 120 which is to become a portion of the cladding region 20, and an outermost layer 500 which is to become the leakage reduction portion 50A. Further, the intermediate region 120 is formed from an inside region 121 which is to finally become optical cladding, and an outside region 122 which is to become physical cladding. The hollow member 200b is also comprised of silica glass, and by inserting the fiber member 200a into the penetrating hole of this hollow member 200b, a member 100A which is to become the core fiber region is obtained.

Next, while a plurality of members 100A manufactured as described above (a plurality of members which are each to become a core fiber region) are bundled, by moving a heater 300 in the direction indicated by the arrow B (corresponding to the length direction of the plurality of members 100A), integral formation is performed (see FIG. 5(b)). Through this integral formation process, a preform 100B of the multi-core optical fiber is obtained. As is also explained in a specific example below, it is preferable that the outermost layer 500 which is to become the leakage reduction portion 50A have an absorption coefficient or a scattering coefficient larger than that of the outside region 122 which is to become physical cladding. Further, in the process of integral formation by heating, the viscosity of the outermost layer 500 which is to become the leakage reduction portion 50A is lower than that of the outside region 122 which is to become physical cladding.

Figure 6:
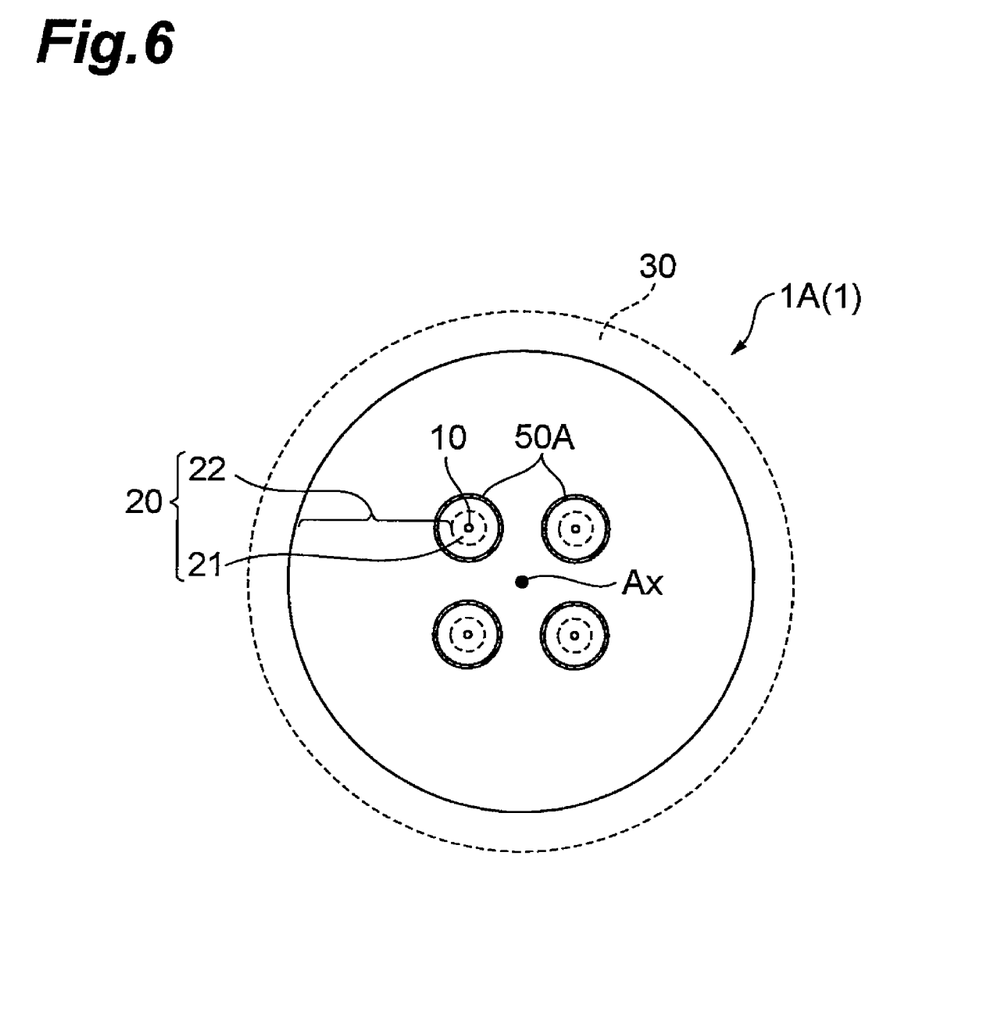
FIG. 6 is a view showing the cross-sectional structure of the multi-core optical fiber according to the present embodiment obtained by the manufacturing processes shown in FIG. 5.

And, as shown in FIG. 5(c), by drawing one end of the preform 100B thus obtained while heating with a heater 310, the multi-core optical fiber 1 having the cross-sectional structure shown in FIG. 6 is obtained. The drawing device for the preform 100B comprises at least a roller 330 to take up the drawn multi-core optical fiber 1 by rotating in the direction indicated by the arrow C, and a device 320 which, immediately after drawing from the preform 100B, covers the surface of the bare optical fiber with a resin.

FIG. 6 shows the cross-sectional structure of the multi-core optical fiber 1 obtained through the above manufacturing processes. The cross-sectional structure of the multi-core optical fiber 1A shown in FIG. 6 substantially includes the cross-sectional structure of FIG. 4. That is, the multi-core optical fiber 1A comprises a bare optical fiber including the plurality of core regions 10, and the resin covering 30 provided on the outer periphery of the bare optical fiber. In the bare optical fiber, the plural core fiber regions are arranged in the same cross-section, and each core fiber region is constituted by the core region 10 and the cladding region 20 surrounding the core region 10. Further, the cladding region 20 can be differentiated into the optical cladding 21 and the physical cladding 22, and it is preferable that the leakage reduction portion 50A be arranged within the cladding region 20, in particular within the physical cladding 22. In this way, in the multi-core optical fiber 1A, the plurality of core regions 10 exist within the common cladding region, and moreover have a structure in which the leakage reduction portion 50A surrounds the vicinity of each core region 10. Due to the blocking of leakage light from core regions 10 by the leakage reduction portions 50A, crosstalk between core regions 10 can be effectively reduced.

Figure 7:
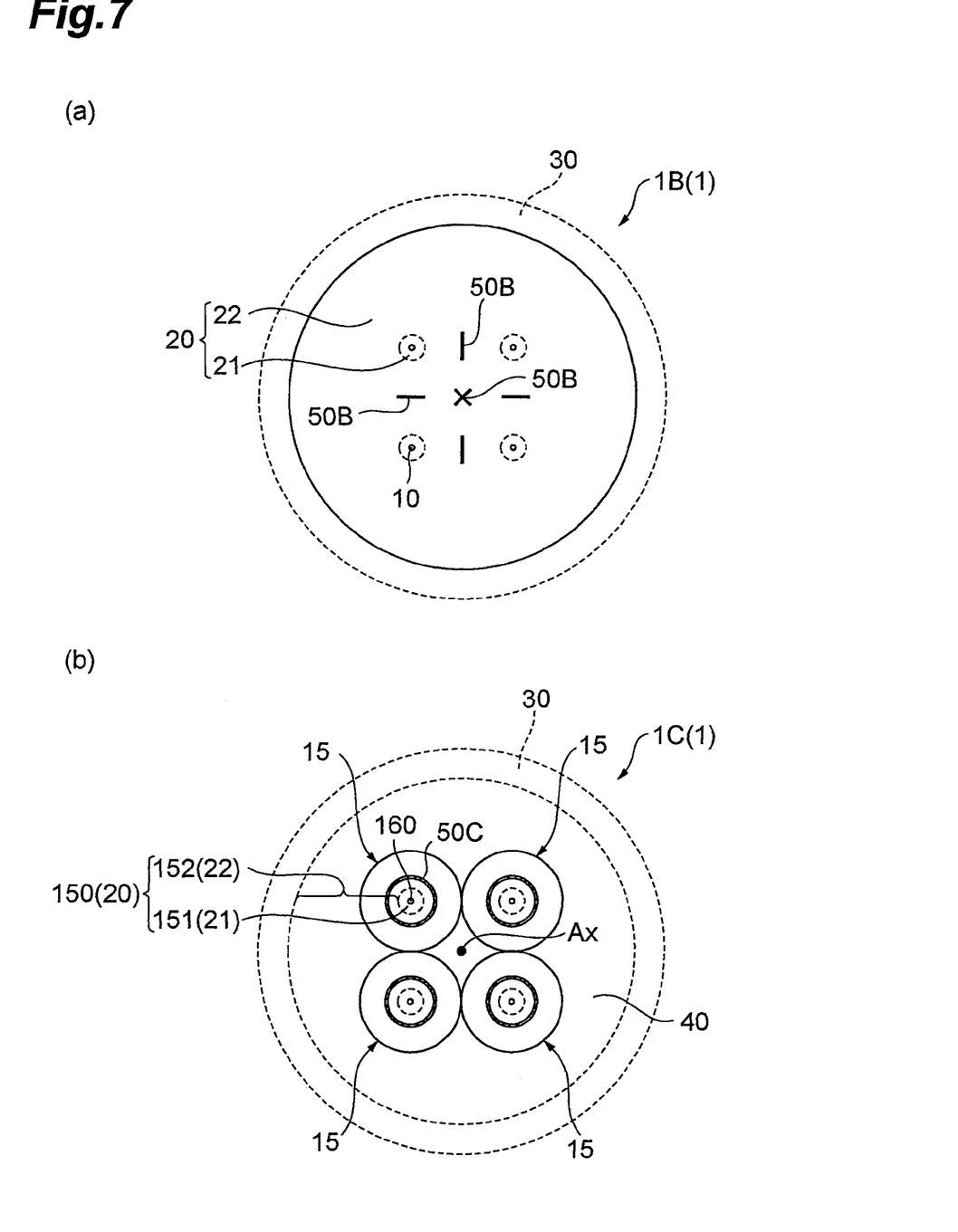
FIG. 7 is a view showing the cross-sectional structure of another embodiment of a multi-core optical fiber according to the present invention.

The cross-sectional structure of the multi-core optical fiber 1 according to the present embodiment is not limited to the cross-sectional structures shown in FIGS. 4 and 6 above, and various modifications are possible. FIG. 7 shows the cross-sectional structure of another embodiment of a multi-core optical fiber according to the present invention.

That is, the multi-core optical fiber 1B shown in FIG. 7(a) has a structure in which the plurality of core regions 10 exist within the cladding region 20, and moreover the leakage reduction portions 50B are arranged between the core regions 10. In the example of FIG. 7(a), the leakage reduction portion 50B is also arranged between core regions 10 positioned on diagonal lines therebetween, but when the interval between the core regions 10 on the diagonal lines are large, and the effect of crosstalk is predicted to be small, the leakage reduction portion 50B positioned in the center need not be provided.

Further, in the multi-core optical fiber 1B also, the common cladding region 20 can be differentiated into the optical cladding 21 positioned in the vicinity of each core region 10, and the physical cladding 22 which covers the optical cladding 21. In the multi-core optical fiber 1B, the core fiber regions, each of which contains the core region 10, shares the physical cladding 22. That is, in the multi-core optical fiber 1B, the adjacent core fiber regions among the plurality of core fiber regions are in contact with each other, through the leakage reduction portion 50B.

On the other hand, the multi-core optical fiber 1C shown in FIG. 7(b) has a structure in which a plurality of core fibers 15, each comprising a core region 160 and a cladding region 150 surrounding the core region 160, are formed integrally. In each of the core fibers 15, the cladding region 150 is constituted by an optical cladding 151 which directly covers the core region 160 and a physical cladding 152 provided on the outer periphery of the optical cladding 151. Further, within the physical cladding 152, a ring-shaped leakage reduction portion 50C is positioned surrounding the core region 160 in the cross-section of FIG. 7(b). Particularly, in the multi-core optical fiber 1C, a jacket layer 40 is provided so as to cover the outer periphery of the integrally formed core fibers 15, and a resin covering 30 is provided on the outer periphery of the jacket layer 40.

In each of the multi-core optical fibers 1A, 1B, 1C having cross-sectional structures as described above (see FIGS. 6 and 7), the core regions 10, 160 and the cladding regions 20, 150 are comprised of silica-based glass. The resin covering 30 provided on the outer periphery of the cladding regions 20 and jacket layer 40 are for example a plastic covering. Further, in the multi-core optical fibers 1A through 1C of the above-described embodiment, the leakage reduction portions 50A through 50C are provided on the physical cladding 22, 152 in the cladding regions 2, 150; but no constraints in particular are imposed in the case that the position is a certain distance from the core regions 10, 160. Further, in the example of the multi-core optical fiber 1C shown in FIG. 7(b), the leakage reduction portions 50C may be arranged between two adjacent core fibers 15.

Figure 8:
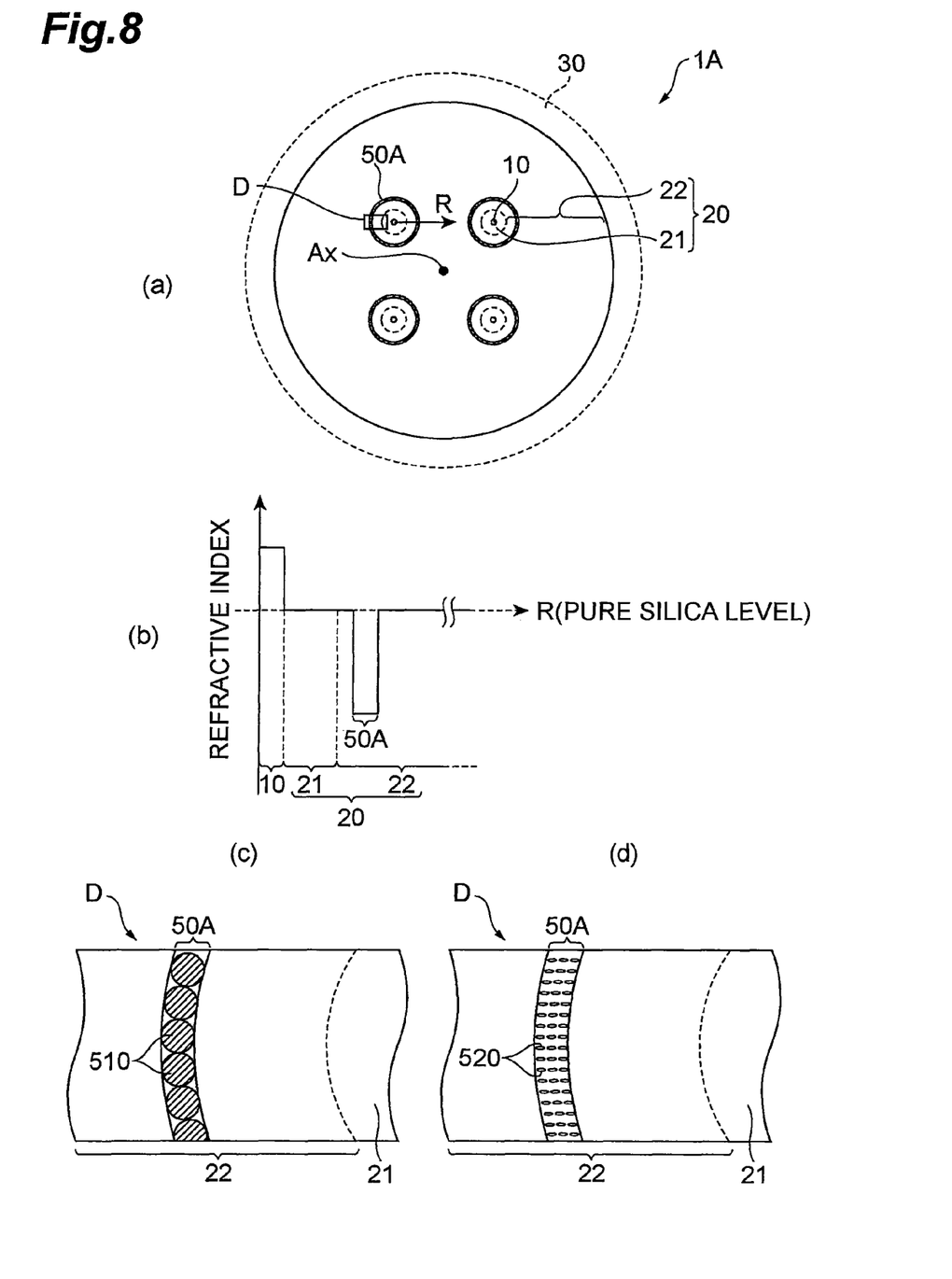
FIG. 8 is a view for explaining a first specific example of a leakage reduction portion which can be applied to a multi-core optical fiber according to the present invention.
Figure 9:
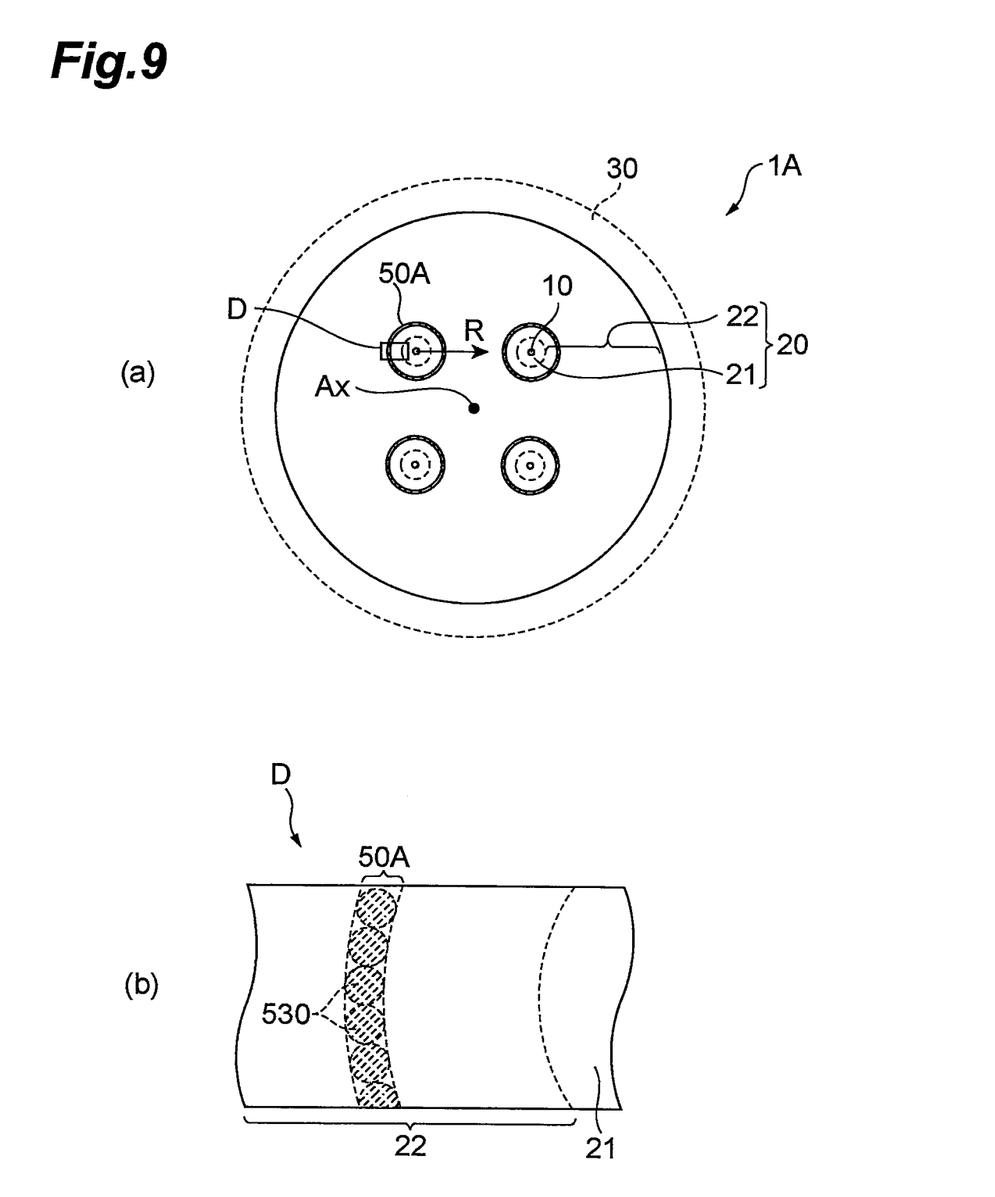
FIG. 9 is a view for explaining a second specific example of a leakage reduction portion which can be applied to a multi-core optical fiber according to the present invention.

Next, a more specific structure of the leakage reduction portion 50 (corresponding to 50A through 50C in FIGS. 6 and 7) is explained, referring to FIGS. 8 and 9. In FIGS. 8 and 9, examples are shown of the multi-core optical fiber 1A shown in FIG. 6; but the leakage reduction portions 50B, 50C can be formed similarly in other multi-core optical fibers 1B and 1C, and any of the leakage reduction portions 50A through 50C have functions for deflection control through absorption, scattering, confinement, and similar.

First, FIG. 8 is a view for explaining the first specific example of the leakage reduction portion 50A which can be applied to a multi-core optical fiber 1A according to the present invention. In FIG. 8(a), the cross-sectional structure of the multi-core optical fiber 1A is shown, corresponding to the cross-sectional structure of FIG. 6. In the first specific example, as the leakage reduction portions 50A, layers with low refractive index, called trench layers, are provided, formed in a ring shape so as to surround the core regions 10. That is, the leakage reduction portions 50A of the first specific example perform deflection control of leakage light by confining leakage light within regions further inside than the leakage reduction portions 50A. FIG. 8(b) is the refractive index profile of one core fiber region in the multi-core optical fiber 1A. And, FIG. 8(c) is an enlarged view of the portion D in FIG. 8(a), and is an example in which a layer with low refractive index is realized by forming a plurality of hollow holes 510 as the leakage reduction portion 50A of the first specific example. FIG. 8(d) is an enlarged view of the portion D in FIG. 8(a), and is an example in which a layer with low refractive index is realized by forming a plurality of voids 520 as the leakage reduction portion 50A of the first specific example.

The multi-core optical fiber 1A is a silica-based glass fiber; the plurality of core fiber regions are arranged in the cross-section shown in FIG. 8(a), and the plurality of core fiber regions are constituted by the corresponding single core regions 10 and the common cladding region 20. The cladding region 20 can be differentiated into the optical cladding 21 in the vicinity of the core regions and the physical cladding 22; and the ring-shaped leakage reduction portions 50A surrounding the core regions 10 are provided within the physical cladding 22. The leakage reduction portion 50A of the first specific example functions to suppress propagation of leakage light to the adjacent core regions 10 by confining leakage light which has propagated from the core region 10 to the inside region surrounded by the leakage reduction portion 50A. In the core fiber region having such a structure, the core region 10 is comprised of silica glass doped with $GeO_2$, the cladding region 20 comprises pure silica glass, and the relative refractive index difference between the core region 10 and the cladding region 20 is 0.35% (0.4% or lower). Further, the outer diameter of the core region 10 is 8.5 μm. Such a core fiber region has an MFD of 10.2 μm at a wavelength of 1.55 μm. Also, the electric field amplitude in this core fiber region has a peak value at the center of the core region 10 (hereafter referred to as core center), and the position at which the amplitude is $10^{-4}$ of the peak value is a position removed 28.5 μm from the core center. Hence, it is preferable that the leakage reduction portion 50A be provided so as to be removed from the core center by 25.5 μm or more (a distance of 5/2 times the MFD) in the radial direction R, or be provided within the physical cladding 22 so as to be removed from the core center by 28.5 μm or more in the radial direction R. In the first specific example, the leakage reduction portion 50A is a ring-shaped region formed in the range 35 μm to 50 μm from the core center.

First means for realizing the leakage reduction portion 50A of the first specific example realizes a deflection control of leakage light from each core region 10 by designing a refractive index profile such as that shown in FIG. 8(b). In the first means, in particular, leakage light deflection control is performed by adopting a trench-structure refractive index profile as the refractive index profile for each of the plural core fiber regions in the multi-core optical fiber 1A. That is, as shown in FIG. 8(b), by doping F to the silica glass region corresponding to the leakage reduction portion 50A, a relative refractive index difference between the leakage reduction portion 50A and the optical cladding 21 of −0.7% is set. The multi-core optical fiber 1A is a silica-based fiber, and as is also seen from the refractive index profile in FIG. 8(b), the core region 10 is comprised of silica glass doped with $GeO_2$, while the cladding region 20 comprises pure silica glass. Further, the relative refractive index difference between the core region 10 and the cladding region 20 is 0.4% or lower. The refractive index of the leakage reduction portion 50A provided within the physical cladding 22 is made lower than that of pure silica glass by doping F (a refractive index reducer).

Further, FIG. 8(c) is an enlarged view of the portion D in FIG. 8(a), and shows second means for realizing a deflection control of leakage light from each core region 10, as the leakage reduction portion 50A of the first specific example. The second means controls deflection of leakage light by providing the plurality of hollow holes 510 in a region corresponding to the leakage reduction portion 50A, extending along the optical axis AX.

Further, FIG. 8(d) is an enlarged view of the portion D in FIG. 8(a), and shows third means for realizing a deflection control of leakage light of each core region 10, as the leakage reduction portion 50A of the first specific example. The third means controls deflection of leakage light by forming the leakage reduction portion 50A formed by dispersing voids 520 within a region extending along the optical axis AX, which is a ring-shaped region surrounding each core region 10 in the cross-section shown in FIG. 8(a).

By forming the leakage reduction portion 50A as a low-refractive index region, a hollow hole formation region, or a void-dispersed region as in the above-described first through third means, the relative refractive index difference between the leakage reduction portion 50A and the cladding region 20 can be made significantly lower. As a result, a portion of leakage light from the core region 10 propagating toward the adjacent core region 10, arising from small-radius bending or the like, is confined within an inside region surrounded by the leakage reduction portion 50A.

Here, the fraction of light confined within inside regions surrounded by the leakage reduction portions 50A among the leakage light propagating from the core regions 10 toward the resin covering 30 of the multi-core optical fiber 1A can be adjusted, using the distance from the core regions 10 to the leakage reduction portions 50A, the thickness of the leakage reduction portions 50A, and the relative refractive index difference between the leakage reduction portions 50A and the cladding regions 20 in the configuration of the first means, the arrangement and similar of hollow holes in the configuration of the second means, and the arrangement of voids and similar in the configuration of the third means. Hence, it is possible to reduce the light quantity of leakage light which has passed through the leakage reduction portions 50A to 1/10 or lower of the light quantity $P_0$ of the leakage light which has arrived at the leakage reduction portions 50A via a portion of the cladding regions 20 (optical cladding 21). Through the appropriate arrangement of hollow holes or voids, it is also possible to confine leakage light within the inside regions surrounded by the leakage reduction portions 50A by means of a photonic band-gap effect.

The leakage reduction portion 50A formed as described above exists in each core fiber region at a position 5/2 times the MFD or greater from the core region center, or, outside the position in each core fiber region at which the electric field amplitude is $10^4$ of the peak value (the peak value taken at the core center) or lower. Hence, the influence on light propagating within the core region 10 of the existence of the leakage reduction portion 50A is at a level which can effectively be ignored, and the effect of the leakage reduction portion 50A on transmission losses and other characteristics is also at a level which can be ignored. Further, because a portion of the leakage light leaks to outside the leakage reduction portion 50A, the light component confined to within the inside region of the leakage reduction portion 50A is also gradually attenuated with propagation of the light component. Therefore, no coupling occurs between the light component confined within the inside region surrounded by the leakage reduction portion 50A and light which again propagates within the core region 10 (an influence of the light component confined within the inside region of the leakage reduction portion 50A on transmission characteristics of light propagating within the core region 10 can be effectively avoided).

Next, FIG. 9 is a view for explaining a second specific example of a leakage reduction portion which can be applied to a multi-core optical fiber according to the present invention. The leakage reduction portion 50A of the second specific example performs deflection control of leakage light by increasing scattering of leakage light which has arrived from the core region 10 in each core fiber region. FIG. 9(a) shows the cross-sectional structure of the multi-core optical fiber 1A, which corresponds to the cross-sectional structure of FIG. 6. In the second specific example also, similarly to the first specific example, the ring-shaped leakage reduction portion 50A is formed so as to surround the core region 10. FIG. 9(b) is an enlarged view of the portion D in FIG. 9(a), and is an example in which, as the leakage reduction portion 50A of the second specific example, a region is formed such that at least one of the absorption coefficient and the scattering coefficient is greater than that of the cladding region.

In the multi-core optical fiber 1A shown in FIG. 9(a), the plurality of core fiber regions are arranged in a cross-section, and each of the plurality of core fiber regions is constituted by the corresponding single core region 10 and the common cladding region 20. The cladding region 20 can be differentiated into the optical cladding 21 positioned in the vicinity of the core regions 10, and the physical cladding 22, and the ring-shaped leakage reduction portions 50A surrounding the core regions 10 are provided in the physical cladding 22. The leakage reduction portion 50A of the second specific example functions to reduce the light quantity of leakage light reaching the adjacent core regions 10, by causing scattering in the leakage reduction portion 50A of the leakage light which has propagated from the core region 10. In a core fiber region having such a structure, the core region 10 is comprised of silica glass doped with $GeO_2$, and the cladding region 20 is comprised of pure silica glass, and the relative refractive index difference between the core region 10 and the cladding region 20 is 1%. Further, the outer diameter of the core region 10 is 30 μm. In such a core fiber region, light in the core region 10 is multimode light at wavelength of 1.55 μm, but the MFD of the fundamental mode is 19.8 μm. Further, the electric field amplitude in each of the core fiber regions takes a peak value at the core center, and the position at which the amplitude is $10^{-4}$ of the peak value is a position removed 23.1 μm from the core center. Hence a leakage reduction portion 50A of this second specific example is provided either removed 49.5 μm (a distance equal to $5/2$ times the MFD) or more from the core center in the radial direction R, or removed 23.1 μm or more from the core center in the radial direction R, within the physical cladding 22. In this second specific example, the leakage reduction portion 50A is a ring-shaped region formed in the range 35 μm to 50 μm from the core center.

The leakage light deflection control means shown in FIG. 9(b) performs a leakage light deflection control by increasing scattering of leakage light through minute anisotropic members 530, added to a region corresponding to the leakage reduction portion 50A. As such a leakage reduction portion 50A, for example glass containing elongated silver halide particles (minute anisotropic members 530) is conceivable.

By adding the above minute anisotropic members 530 to the ring-shaped leakage reduction portion 50A as described above, scattering of leakage light in the leakage reduction portion 50A (as a result of which, leakage light is deflected), and, absorption of leakage light (leakage light is attenuated), are greater than in other glass regions. That is, the leakage reduction portion 50A has a large absorption coefficient, and a large scattering coefficient, compared with the cladding region 20. Therefore, by means of a leakage reduction portion 50A of this second specific example also, the light quantity of leakage light which has passed through the leakage reduction portion 50A and is propagating toward the adjacent core region 10 can be effectively reduced.

The above-described first and second specific examples explained examples of the leakage reduction portions 50A of the multi-core optical fiber 1A shown in FIG. 6, but application to the leakage reduction portions 50B and 50C of either of the multi-core optical fibers 1B and 1C shown in FIG. 7 is also possible.

DESCRIPTION OF THE REFERENCE NUMERALS 1, 1A, 1B, 1C . . . multi-core optical fiber; 10, 160 . . . core region; 21, 151 . . . optical cladding; 22, 152 . . . physical cladding; 20, 150 . . . cladding region; 50, 50A, 50B, 50C . . . leakage reduction portion; 30 . . . resin covering; 510 . . . hollow hole; 520 . . . void; and 530 . . . silver halide particle (minute anisotropic member).

The invention claimed:
1. A multi-core optical fiber, comprising:
a plurality of core fiber regions in a same cross-section, each of the core fiber regions comprising a core region extending along an optical axis, and a cladding region provided on an outer periphery of the core region;
a leakage reduction portion provided on a straight line connecting the core regions in the adjacent core fiber regions, among the plurality of core fiber regions; and
a layer provided in the outside of the leakage reduction portion, the layer having a refractive index higher than that of the leakage reduction portion, wherein:
the multi-core optical fiber is a silica-based optical fiber, and
the leakage reduction portion has a refractive index profile such that a confinement factor of propagating light in a region surrounded by the leakage reduction portion is raised.
2. The multi-core optical fiber according to claim 1, wherein, in the leakage reduction portion, as a structure for effectively reducing a refractive index, either a refractive index reducer is doped or a hollow hole is formed in each of the cladding regions of the plurality of core fiber regions.
3. The multi-core optical fiber according to claim 1, wherein, the core region in each of the core fiber regions allows light with a wavelength to be used to propagate in a single-mode therein.

* * * * *